United States Patent [19]

Nimon

[11] Patent Number: 5,291,480
[45] Date of Patent: Mar. 1, 1994

[54] SYNCHRONOUS NODE CONTROLLERS FOR SWITCHING NETWORK

[75] Inventor: Kimmy F. Nimon, Arlington, Tex.

[73] Assignee: DSC Communications Corporation, Plano, Tex.

[21] Appl. No.: 717,420

[22] Filed: Jun. 18, 1991

[51] Int. Cl.⁵ .............................................. H04Q 11/04
[52] U.S. Cl. ................................... 370/58.1; 370/85.13; 370/100.1; 340/825.5
[58] Field of Search .................. 370/58.1, 85.13, 85.14, 370/60, 60.1, 94.1, 94.2, 85.1, 110.1, 100.1; 340/825.5

[56] References Cited

U.S. PATENT DOCUMENTS

| | | | |
|---|---|---|---|
| 4,646,287 | 2/1987 | Larson et al. | 370/60 |
| 4,719,621 | 1/1988 | May | 370/60 |
| 4,885,739 | 12/1989 | Read et al. | 370/58.1 |
| 5,020,020 | 5/1991 | Pomfret et al. | 370/60 |
| 5,027,349 | 6/1991 | Thorne | 370/58.1 |
| 5,067,123 | 11/1991 | Hyodo et al. | 370/58.1 |
| 5,189,670 | 2/1993 | Inglis | 370/94.1 |

OTHER PUBLICATIONS

Alexandridis-Microprocessor System Design Concept-1984 pp. 157–160.

Primary Examiner—Douglas W. Olms
Assistant Examiner—Chau T. Nguyen
Attorney, Agent, or Firm—Baker & Botts

[57] ABSTRACT

A synchronized node control system, which provides an interface between user processors, which originate and receive messages, and a packet switching network that uses a multi-level communications protocol. Clusters of user processors are each associated with a node controller that communicates with a gateway of the switching network. Each node controller is programmed to handle level two protocols for communicating messages between node controllers, and level three protocols for communicating messages between said user processors. Each node controller is further programmed to perform processes associated with these protocols such that all node controllers perform the same schedule of processes during a node control frame period. Each node controller is further programmed to synchronize its internal level two and level three operations within the node controller frame period, and to synchronize its level two processes, such that an originating and a destination node controller transfer a particular packet during a packet frame period.

33 Claims, 11 Drawing Sheets

| L2 CONTROLLER | PCP | L3 CONTROLLER | TIME (μSEC) |
|---|---|---|---|
| | SAVE REGISTERS | | 000.00 |
| OPAK/SPAK LOW/ HOLD RELEASED | L2 FIFO | | 7.75 |
| HOLD SET | PENDING SERVICE REQUEST LIST | | 31.85 |
| | L3 FIFO | SCAN DATA AVAIL. | 38.95 |
| OPAK/SPAK LOW/ HOLD RELEASED | MAINTENANCE | | 74.35 |
| | L2 FIFO | | 75.35 |
| HOLD SET | PENDING SERVICE REQUEST LIST | | 99.45 |
| | L3 EVENT QUEUE | | 106.55 |
| | MAINTENANCE | | 140.25 |
| OPAK/SPAK LOW/ HOLD RELEASED | L2 FIFO | | 142.95 |
| HOLD SET | PENDING SERVICE REQUEST LIST | | 167.05 |
| | L3 FIFO | HALT | 174.15 |
| | COMPLETE FRAME | RESTART | 176.85 |
| | | | 182.50 |
| | NEXT INTERRUPT | | 202.80 |

*FIG. 6*

| ONC | SNC | TIME (μSEC) |
|---|---|---|
| OPAK RCVD/HOLD SET | SPAK RCVD | 00.00 |
|  | SPAK END | 00.25 |
| SVC REQ FUNC BEGIN |  | 00.75 |
| SVC REQ |  | 1.25 |
| SVC REQ FUNC END |  | 1.50 |
|  | SPAK EXT FUNC BEGIN | 2.00 |
|  | RR | 3.00 |
|  | SPAK EXT FUNC END | 3.25 |
| RDY RCVD | SVC REQ FUNC BEGIN | 3.50 |
|  | SVC REQ | 4.00 |
|  | SVC REQ FUNC END | 4.25 |
|  | RTS RCVD | 5.25 |
| RDY/SERVER NODE TO FIFO | RTS/SERVER CP TO FIFO | 5.75 |
| RDY END |  | 6.00 |
| CTS RCVD |  | 7.50 |
| PKT TRANSFER BEGIN |  | 7.75 |
| CTS END | RTS END | 8.00 |
|  | PKT RCV BEGINS | 8.50 |
| PKT TRANS END |  | 35.50 |
|  | PCK RCVD/PKT RCV END | 36.25 |
| HOLD RELEASED | PKT END/HOLD RELEASED | 37.25 |
| PKTA RCVD |  | 37.75 |
| PKTA TO FIFO |  | 38.75 |
| PKTA END |  | 39.00 |
|  | PKTAA RCVD | 39.25 |
|  | PKTAA TO PCP FIFO | 39.50 |
|  | PKTAA END | 39.75 |

SYNCHRONOUS NODE CONTROLLERS FOR SWITCHING NETWORK

TECHNICAL FIELD OF THE INVENTION

This invention relates to digital switching networks, and more particularly to a node controller for interfacing clusters of processors, which handle messages at a source and a destination, and a switching network, which creates a communications path.

BACKGROUND OF THE INVENTION

U.S. Pat. No. 4,885,739, entitled "Interprocessor Switching Network", assigned to the present assignee, describes a digital switching network for handling data transfers among a number of processors. The system is designed to accommodate a large number of simultaneous connections at fast connection rates. Connections are via a switching matrix, and the data transmission uses packet switching techniques. The switching network is used to make connections for communicating messages within a distributed system of data stations, such as systems of computers or telephones with related supervisory and peripheral equipment. At each data station, clusters of processor-based user equipment originate and receive messages.

The switching network described in U.S. Pat. No. 4,885,739 is characterized by several hardware features, including node controllers for handling nodes of cluster processors, gateways for providing an interface for the node controllers into the switching matrix, an interchange control system, and an interchange that includes the switching matrix. It is also characterized by the use of a multi-level communications protocol, having at least three levels. A first level handles communications between a gateway and the switching system. A second level handles communications between node controllers. A third level handles communications between cluster processors.

Typically, the node controllers in switching networks such as described in U.S. Pat. No. 4,885,739 are interrupt driven. Interrupt signals trigger processes that set up a communications path and send and receive the data. Although this technique works well in practice, as the number of data stations increases, so does the complexity of the switching process. The generation and communication of the various control and data messages requires increased processing overhead.

To meet the demands of increased message volume, existing systems attempt to accomplish real time processing with a high interrupt rate. An interrupt occurs once for every processing event. Thus, during the time between the sending of a message from an originating cluster processor and the receipt of the message at a destination cluster processor, a number of interrupts may occur. Faster message processing rates are attempted by increasing the interrupt rate. However, a problem with faster interrupt rates is that fewer events can be processed during each interrupt period. Unprocessed events must be queued for processing at a later time. Dequeueing occurs during "catchup periods" when the rate of originating messages slows. Thus, waiting times and overall throughput become a function of probability and statistics.

A need exists for an improved method of using a switching network to handle a large number of messages in a given time.

SUMMARY OF THE INVENTION

One aspect of the invention is a synchronized node control system, which provides an interface between user processors, which originate and receive messages, and a packet switching network that uses a multi-level communications protocol. Clusters of user processors are each associated with a node controller that communicates with a gateway of the switching network. Each node controller is programmed to handle level two protocols for communicating messages between node controllers, and level three protocols for communicating messages between said user processors. Each node controller is further programmed to perform a repeating schedule of processes associated with these protocols during a node controller frame, such that all node controllers follow a synchronized processing schedule. Each node controller has packet control circuitry for processing these node controller processes, a second level control circuit, a third level control circuit, and a packet data memory. Within each node controller, the packet control and second and third level control circuities are programmed to perform synchronized interactions during a packet frame. The second level control circuitry of each node controller is further programmed so that the originating and the destination node controller transfer a particular packet during the same packet frame.

A technical advantage of the invention is a fast system throughput in switching networks. Synchronization of node controllers permits a server node controller to be ready to receive a message during the same frame period that an originating node controller has the message to send. Processing events are organized within regularly occurring frames, rather than according to random event interrupts. As a result, the response time of the destination node controller is predictable, which permits the switching network to be more easily designed to meet a predetermined throughput rate.

BRIEF DESCRIPTION OF THE DRAWINGS

FIG. 6 is a timeline of the packet control, second level communications, and third level communications control processes performed within each node controller.

FIG. 7 is a timeline of the second level control processes performed by an originator and server node controller.

DETAILED DESCRIPTION OF THE INVENTION

Abbreviations

The following is an explanation of abbreviations used in this patent application:

CP: cluster processor
CTS: clear to send
DCP: destination cluster processor
DMA: direct memory access
FIFO: first-in, first out
GC: group controller
GW: gateway
IN: interchange
INC: interchange control
INS: interchange
MC: maintenance controller
NC: node controller
NOP: no operation
O**: originating, i.e., ONC for originating node controller
OCP: originating cluster processor
OGC: originating group controller
OGW: originating gateway
ONC: originating node controller
OPAK: originator path acknowledgement
PDM: packet data memory
PKT: packet
PKTA: packet acknowledgement
PKTAA: packet acknowledgement acknowledgement
PUA: packet unavailable
RCG: redundancy code generator
RDY: ready
RFS: request for service
RR: release request
RTS: request to send
RUA: receiver unavailable
S**: server, i.e., SNC for server node controller
SGC: server group controller
SGW: server gateway
SM: switch matrix
SN: switching network
SNC: server node controller
SPAK: server path acknowledgement
SRD: service request distributor
TUA: transmitter unavailable

System Apparatus Overview

Figure 1:
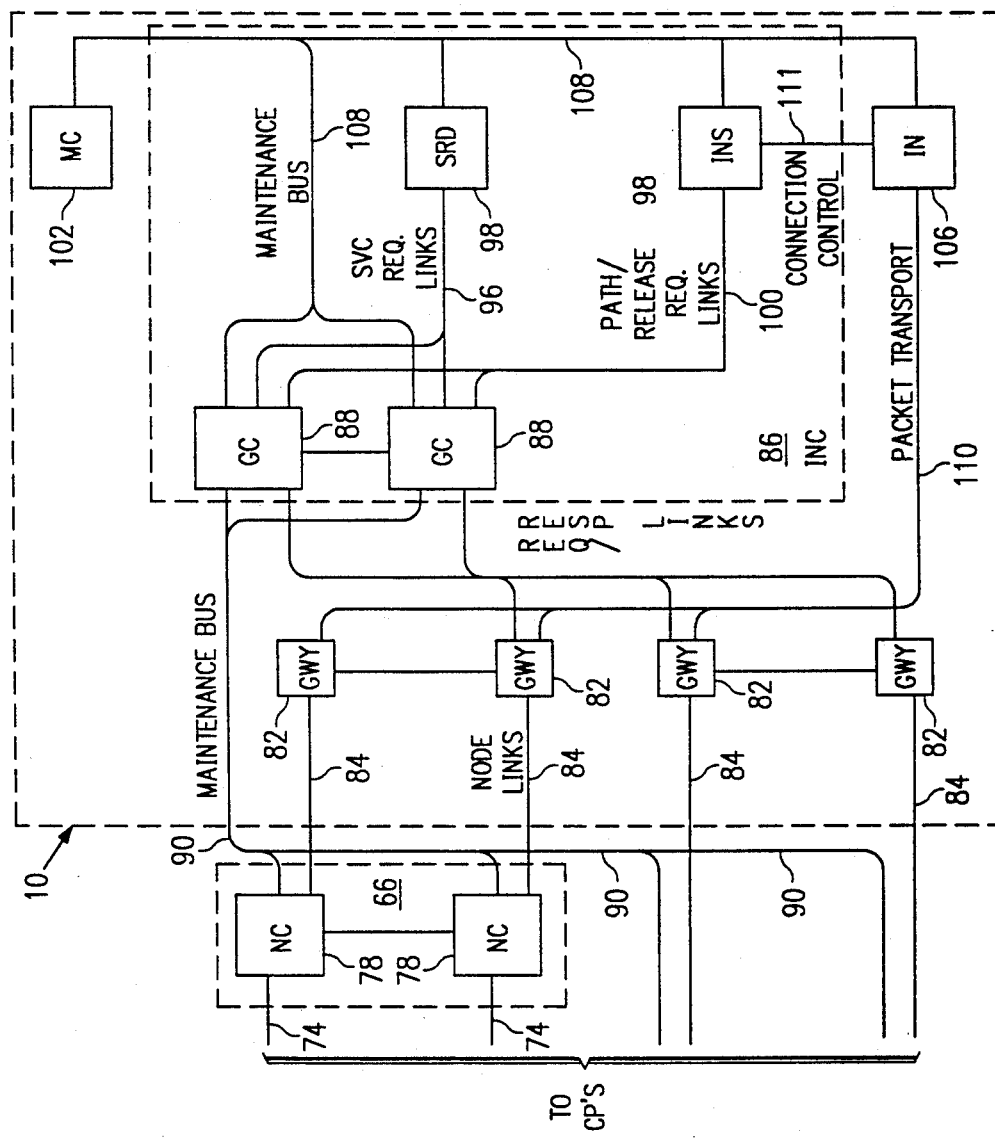
FIG. 1 is a block diagram of a switching network, such as is used with the invention.

FIG. 1 is a block diagram of a switching network (SN) 10, together with a node controller (NC) system 66. SN 10, with a different NC system, is described in U.S. Pat. No. 4,885,739, in which the node controller system is designated as the "network interface".

NC system 66 is a part of another switching network described in pending U.S. Ser. No. 07/680,327, entitled "Improved Interprocessor Switching Network", attorney docket No. 36560-1490.

Both U.S. Pat. No. 4,885,739 and U.S. Ser. No. 07/680,327 are incorporated herein by reference. The switching network of the earlier patent or the switching network of the pending patent may both use NC system 66 described herein.

Basically, each SN 10 with which NC system 66 is used has a number of gateways (GW's) 82, an interchange control system 86, an interchange (IN) 106, and a maintenance controller (MC) system 102. Each of these parts, or alternative parts, are described in the patent and the patent application cited in the preceding paragraph. Other switching networks having similar characteristics and operation, as described in the background of this patent application, may also use NC system 66.

Figure 2:
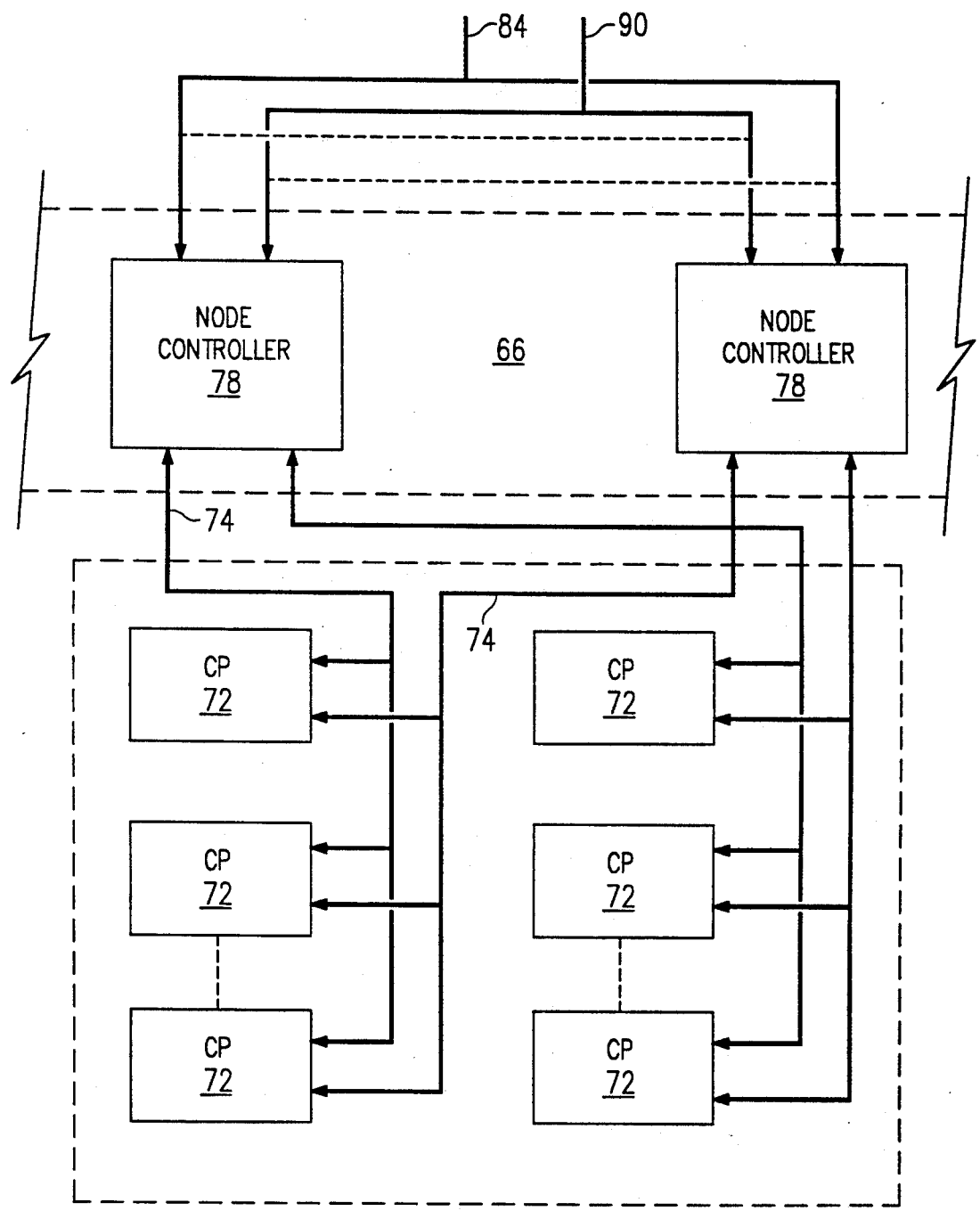
FIG. 2 is a block diagram of one node of a node control system and its associated cluster processors.

FIG. 2 is a block diagram of one node of NC system 66, connected to a number of user processors 72, which are described as cluster processors (CP's) 72 because they are arranged in groups dedicated to specific applications. CP's 72 are part of a data communications system, of which switching network 10 is also a part. The general function of NC system 66 is to control communications among a number of clusters of CP's 72, whose communications paths are switched via SN 10.

NC system 66 is comprised of a number of node controllers (NC's) 78, which are connected to a processor cluster bus 74. Each NC 78 is responsible for handling all message traffic among the CP's 72 in its cluster, and for handling message traffic to or from its cluster through an associated GW 82. As shown in FIG. 2, each node may have a pair of node controllers 78 for redundancy.

SN 10 uses a multi-level communications protocol, having at least three levels. The Level 1 (L1) protocol deals with communications between a GW 82 and IN 106, which creates and releases connections between CP's 72. The Level 2 (L2) protocol deals with communications among NC's 78. The Level 3 (L3) protocol deals with communications among CP's 72. A Level 4 (L4) protocol is used for maintenance functions.

An important feature of the invention is synchronization of node controller processing. This synchronization is implemented with two frame periods: a NC frame and a packet frame.

The use of the NC frame and packet frame are discussed below in connection with FIGS. 5-7, which illustrate the operation of NCs 78 as a system and individually. The NC frame defines a series of processing steps that all NC's 78 perform in parallel. The packet frame is a subset of the NC frame and defines a series of processing steps that include a packet transfer.

In the example of this description, the NC frame is 200 microseconds, and the packet frame is 67 microseconds. However, these time periods are for purposes of example only, and other times could be used, subject to hardware constraints on processing speed.

Figure 3:
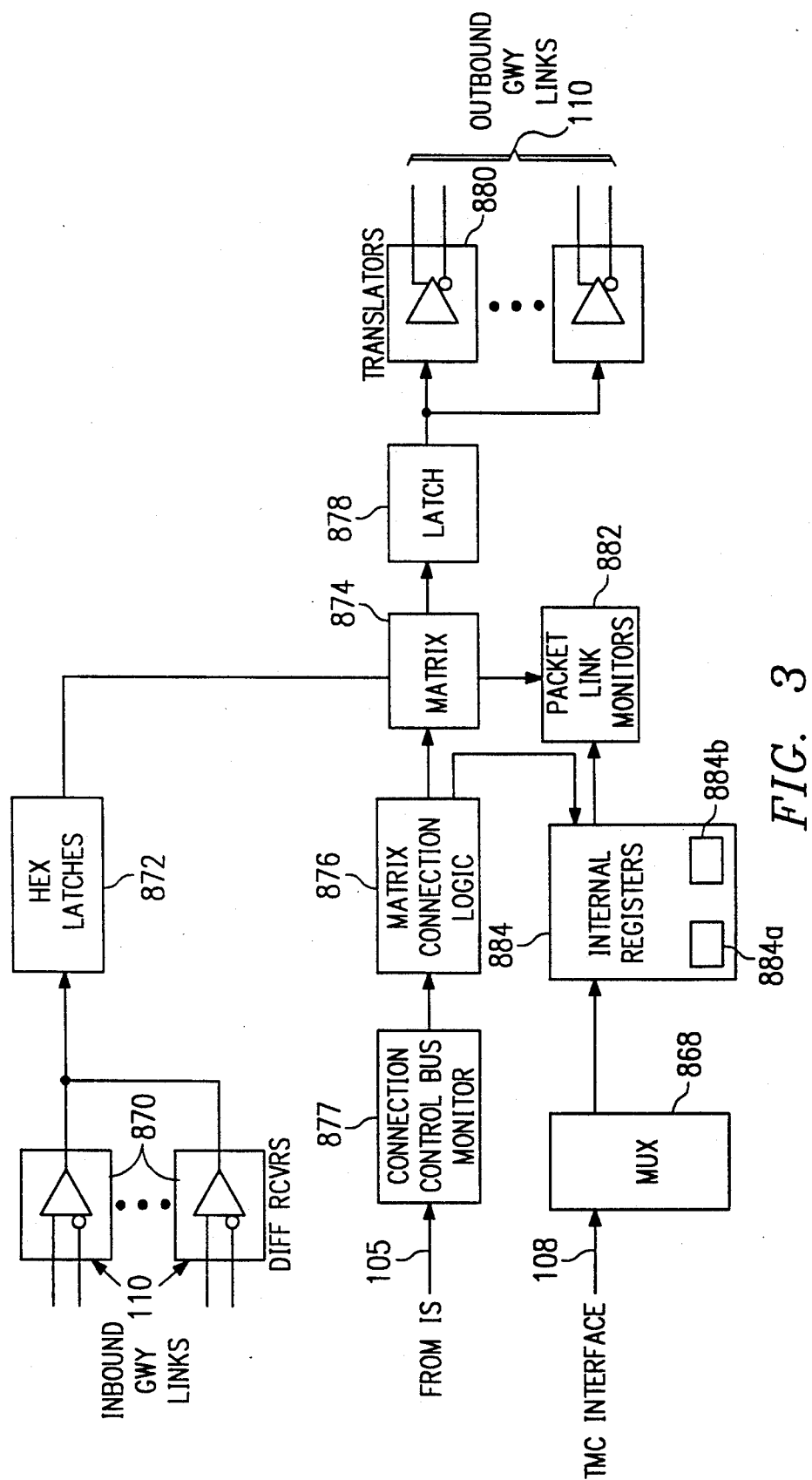
FIG. 3 is a block diagram of an interchange network.

The hardware used to generate a NC synchronization signal is illustrated in FIG. 3, which is a block diagram of IN 106. The NC frame synchronization signal synchronizes NC's 78 to each other. The signal is generated externally to NC system 66, for example by a clock in MC system 102, and is transmitted via IN 106 to all NC's 78. A register 884a within IN 106 stores an address of a designated reference NC 78. Cross-point reset switch 884b connects all other NC's 78 to the reference NC 78. The synchronization signal is sent to all NC's, so that each NC 78 may reset its NC frame.

An advantage of the invention is that existing SN's 10 may be used to implement the NC synchronization signal. For example, the IN 106 of U.S. Pat. No. 4,885,739 has an internal register 884a, which may be given an address for a one-way message. A cross point reset switch 884b is used to write whatever is stored in register 884a to all locations inside the cross-points. It may thus be used to deliver a message to all nodes at the same time. These features can be used to deliver a synchronization signal to all NC's 78.

System Operation Overview

Data to be communicated from one CP 72 to another CP 72, i.e., from an originating CP (OCP) 72 to a destination CP (DCP) 72, is grouped into packets. The packets contain control as well as message data. The control data includes a destination address, so that packets from OCP 72 can be routed to DCP 72 via SN 10.

During the process of communicating a message from OCP to DCP, the protocol used by SN 10 and NC system 66 includes various requests and acknowledgements, herein referred to as "control messages", as distinguished from packet messages.

Although the functions and nomenclature of the other components of SN 10, such as gateways (GW's) 82, group controllers (GC's) 88, interchange control (INC) system 86, and IN 106, may change, the basic operation of NC system 66 remains substantially the same. Communicating a packet message from one CP 72 to another involves an originating node controller (ONC) 78 and a server node controller (SNC) 78. For purposes of this description, "originator" refers to those subsystems of SN 10 that are associated with the OCP 72. "Server" refers to those subsystems associated with the DCP 72.

The general scheme of the switching process is to use NC's 78 to poll CP's 72 for messages. If an originating CP (OCP) 72 on one of the cluster busses 74 desires to communicate with a destination CP (DCP) 72 on another cluster bus 74, its ONC 78 transfers the message to a memory and determines the destination from the message. The ONC 78 posts a request for service control message with its originating GW (OGW) 82, which then passes the request for service to higher levels of SN 10 to establish a connection between the OGW 82 and the server gateway (SGW) 82. Once the connection is set up, the ONC 78 requests to send, and the SNC 78 acknowledges. The ONC 78 and SNC 78 then communicate the packet message.

More specific descriptions of L1 protocols are set out in U.S. Pat. No. 4,885,739 and U.S. Ser. No. 07/680,327 now U.S. Pat. No. 5,218,602. L2 and L3 protocols are further described in the following sections of this patent application.

Node Controller Apparatus

Figure 4:
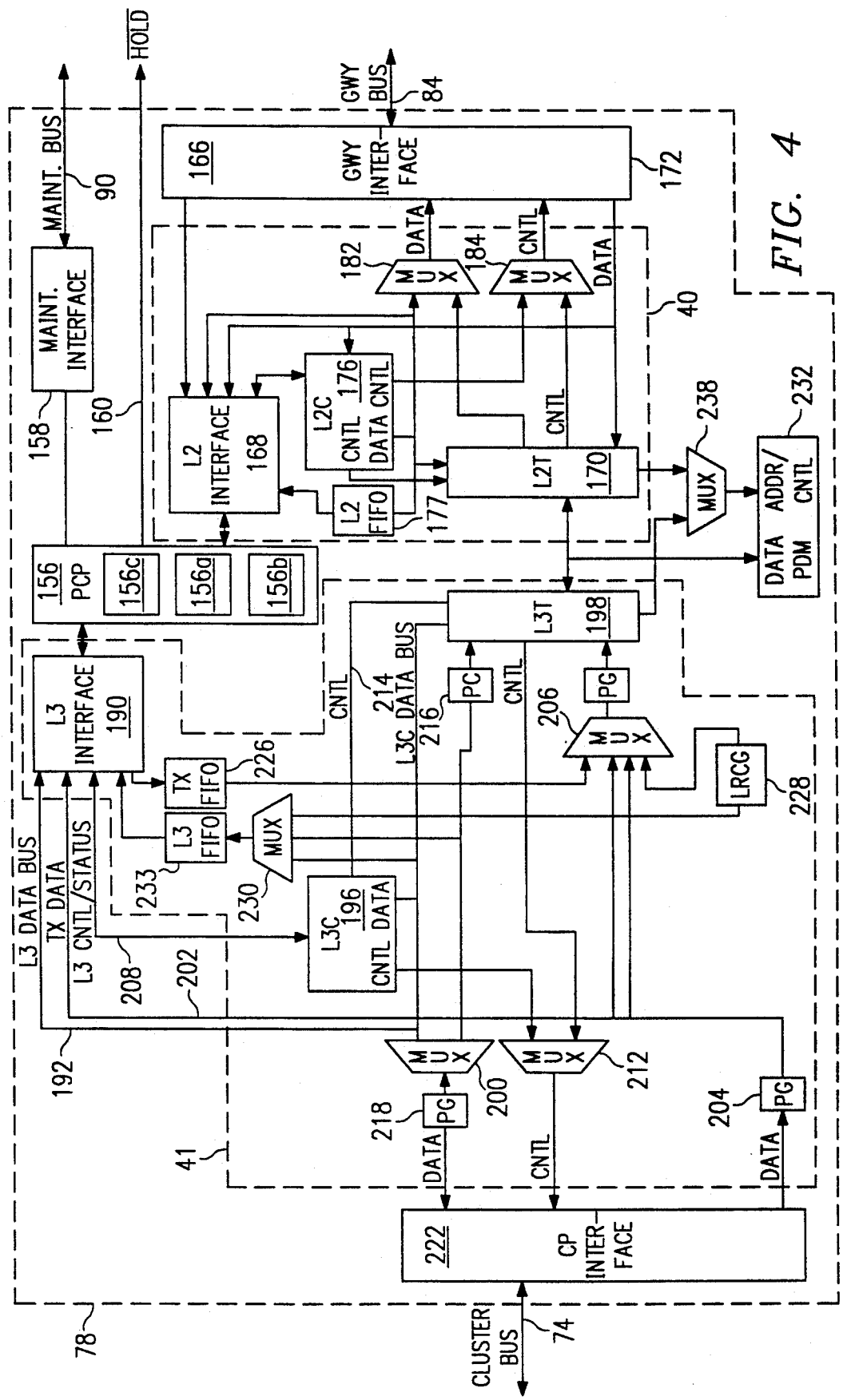
FIG. 4 is a block diagram of a node controller.

FIG. 4 is a block diagram of a NC 78. The main components of NC 78 are a packet control processor (PCP) 156, packet data memory (PDM) 232, L2 subsystem 40, and L3 subsystem 41. Interfaces for connecting these components to components of SN 10 outside NC 78 include a maintenance interface 158, CP interface 222, and GW interface 166.

PCP 156 is a high speed microprocessor, such as the 32-bit MC 68020 processor manufactured by Motorola, Inc. In the embodiment of this description, it is capable of addressing 4 gigabytes of memory. PCP 156 has an internal random access (RAM) memory 156a for data storage and code memory 156b. For providing internal timing, PCP 156 includes a counter-timer-parallel I/O unit (CIO) 156c, which generates a clock interrupt at predetermined intervals. This signal defines the NC frame period.

PCP 156 is connected to maintenance bus 90 via maintenance interface 158. PCP 156 is also connected to its associated GW 82 by a hold line 160, which is part of processing node links 84.

The processing of PCP 156 may be divided into two types: packet control processing and operating system processing. Packet control processing includes packet-level message routing, buffer management of PDM 232, and initializing and controlling L2 subsystem 40 and L3 subsystem 41. Operating system processing includes initializing and controlling communications channels.

As discussed above, an externally generated synchronization signal provides a NC frame interrupt, which transfers control of SN 10 to PCP 156 and defines a NC frame period. PCP 156 is programmed so that a portion of each frame is allotted to operating system programming. In the example of this description, 10% of each frame is so allotted. The processing steps that occur within each interrupt are described below in connection with FIGS. 5–11.

PDM 232 provides central storage for packet data. Packets received by NC 78 are stored in PDM 232 by L3 subsystem 41 if from a CP 72 and by L2 subsystem 40 if from a GW 82.

L2 and L3 subsystems 40 and 41 each have a controller, i.e., L2 controller 176 and L3 controller 196. These controllers 176 and 196 are RAM-based state controllers, whose RAM's permit access by PCP 156 via PCP interfaces 168 and 190. Preferably, controllers 176 and 196 each have a dual-ported RAM, which can be accessed by both the state controller and PCP 156. Controllers 176 and 196 have sequential counting and decode logic circuits that perform control functions and program jumps based on external criteria and on the program stored in the RAM.

L2 subsystem 40 handles the transfer of packet data between PDM 232 and the GW 82 associated with NC 78. Thus, L2 subsystem 40 handles communications among all NC's 78 of SN 10 via GW's 82. L2 subsystem 40 is comprised of L2 controller 176, L2 transport 170, L2 PCP interface 168, and L2 FIFO 177.

L2 controller 176 resembles a microprocessor in that it may be programmed to perform its tasks. However, L2 controller 176 is event-driven and is best viewed as a processor that executes one or more interrupt handlers. On the transmit side, L2 controller 176 is controlled by PCP 156 by means of a function select register. On the receiving side, L2 controller 175 is controlled by signals and messages from GW 82, such as originator and server path acknowledgements (OPAK and SPAK). L2 transport 170 is a direct memory access (DMA) channel for providing data transfers between PDM 232 and GW 82.

In operation, L2 controller 176 sets up L2 transport 170 for packet data transfers in response to a sequence of events occurring in NC 78 and GW 82. L2 transport 170 then controls transfers of data between GW 82 and PDM 232. Packet-level status information is sent to PCP 156 by L2 controller 176 by means of one or more status registers, as explained below in connection with the processing performed by each NC 78.

L2 FIFO 177 passes status information to PCP 156, which then performs an L2 FIFO process. This process is described below in connection with FIGS. 5–9.

L3 subsystem 41 handles the transfer of packet data between PDM 232 and CP's 72. L3 subsystem 41 comprises L3 controller 196, L3 transport 198, L3 PCP interface 190, and L3 FIFO 233.

L3 controller 196 resembles a microprocessor in that it may be programmed to perform its tasks. L3 transport 198 is a DMA channel under control of L3 controller 196. L3 controller 196 initiates message transfers between CP's 72 and PDM 232, and prepares L3 transport 198 to transfer data to or from a CP 72 as indicated by the status of that CP 72. A dual-ported RAM of L3 controller 196 is divided into sections dedicated to each CP 72 on the cluster bus 74 serviced by NC 78. PCP 156 modifies the code in L3 controller 196 during operation, in accordance with the status of each CP 72. For example, L3 controller 196 may scan some CP's 72 for messages, transfer data into some CP's 72, and transfer data out of some CP's 72. L3 controller 196 executes the code for each CP 72 in a serial fashion, with PCP 156 changing the code depending upon the activity resulting from the previous execution.

L3 controller 196 communicates packet-level status information to PCP 156. L3 controller 196 also transfers packets between PDM 232 and PCP 156 via L3 transport 198.

PCP 156 places data into transmit FIFO 226 to be copied into PDM 232 by L3 transport 198. This data is then sent to a CP 72. L3 controller 196 and L3 transport 198 place data into L3 FIFO 233 for PCP 156 to read. When L3 controller 196 is polling the cluster bus 74, it copies received data into L3 FIFO 233. L3 FIFO 233 and transmit FIFO 226 isolate the timing of PCP 156 from the timing of L3 subsystem 41.

PCP 156 controls L2 controller 176 and L3 controller 196, based on status information that they send to PCP 156. On this basis of this status information, PCP 156 determines what action should be taken, for example, whether a message received from a CP 72 is addressed to a resident CP 72 (part of the same cluster connected to NC 78) and should therefore be sent back out to the cluster via L3 transport 198, or whether the message is addressed to a non-resident CP 72 and should therefore be sent through SN 10 via L2 transport 170.

Multiplexer 230 selects between three L3 inputs to L3 FIFO 233. The first input is connected to cluster interface 222 at the data output port 203. The second and third inputs are connected to L3 controller 196 and L3 transport 198.

GW interface 166 connects NC 78 to GW transmit bus 162 and GW receive bus 164. It is used to transfer messages to and from the GW 82 and to control some GW functions. GW interface 166 is connected to L2 interface 168.

L2 interface 168 is connected to PCP 156. L2 interface 168 is also connected to L2 transport 170 and to a data output of GW interface 166. L2 interface 168 is also connected to a status output of L2 controller 176.

L2 controller 176 has a first control output and a data port, both connected to L2 transport 170. Multiplexer 182 receives an input from the data output and from L2 transport 170. The output of multiplexer 182 is connected to GW interface 166.

Multiplexer 184 receives input from a control output of L2 controller 176 and from a control output of L2 transport 170. Multiplexer 184 has an output connected to GW interface 166. A data port of GW interface 166 is connected to L2 transport 170.

PCP 156 is connected to a L3 PCP interface 190. A L3 controller data bus 192 connects L3 PCP interface 190 with a data port of L3 controller 196, L3 transport 198, and to multiplexer 200. A transmit data bus 202 connects L3 PCP interface 190 to L3 controller 196, to a parity checker (PC) 204, and to multiplexer 206. A L3 controller control/status line 208 also connects L3 PCP interface 190 to L3 controller 196.

L3 controller 196 has a control port, which is connected to multiplexer 212. A control line 214 connects L3 controller 196 to L3 transport 198. L3 transport 198 is connected to a second PC 216, which is connected to a second input of multiplexer 200. A control port of L3 transport 198 is connected to a second input of multiplexer 212. The output of multiplexer 200 is connected to a first parity generator 218, which is connected to a data port of CP interface 222. The output of multiplexer 212 is connected to a control port of CP interface 222. PC 204 is also connected to a data port of CP interface 222. Cluster bus 74 is connected to CP interface 222.

The second input to multiplexer 206 is from transmit FIFO 226, which is also connected to L3 interface 190. The output of a longitudinal redundancy code generator (RCG) 228 is connected to the third input of multiplexer 206. The input to RCG 228 is connected to multiplexer 230 and receive data bus 202. Multiplexer 230 is also connected to L3 controller data bus 192 and to PC 216. The output of multiplexer 230 is connected to L3 FIFO 233.

L2 transport 170 is connected to L3 transport 198 and to PDM 232 Via a data port. An address/control port is connected to multiplexer 238, whose inputs are connected to L2 transport 170 and to L3 transport 198.

Maintenance interface 158 supports the L4 protocol, which performs maintenance operations within SN 10. It is comprised of a full-duplex, high speed parallel communications channel with LIFO buffers. These channels interface PCP 156 to a GC 88, which processes maintenance functions.

Overview of Node Controller Processing

In the preferred embodiment, NC operations are performed using the NC 78 described above, which includes a processor and two controllers, namely, PCP 156 and L2 and L3 controllers 176 and 196. However, the same steps could be performed with other hardware, so long as the necessary FIFO's and other memory structures are maintained in accordance with the description below. For example, controllers 176 and 196 could be replaced with processors.

The following description of the operation of NC system 66 refers to various software and hardware memory structures. These include the L2 FIFO 177 and L3 FIFO 233 discussed above, as well as software-implemented data structures that are maintained by PCP 156 and controllers 176 and 196. These software data structures include various lists, buffers, and queues, which are handled by means of well known programming techniques. Unless otherwise indicated, these software structures are processed by PCP 156.

The following description uses the abbreviations listed at the beginning of this patent application, but omits some element numbers to facilitate readability. For example, CP's 72 are referred to as OCP's and DCP's, with these abbreviations used descriptively with various message names.

Figure 5:
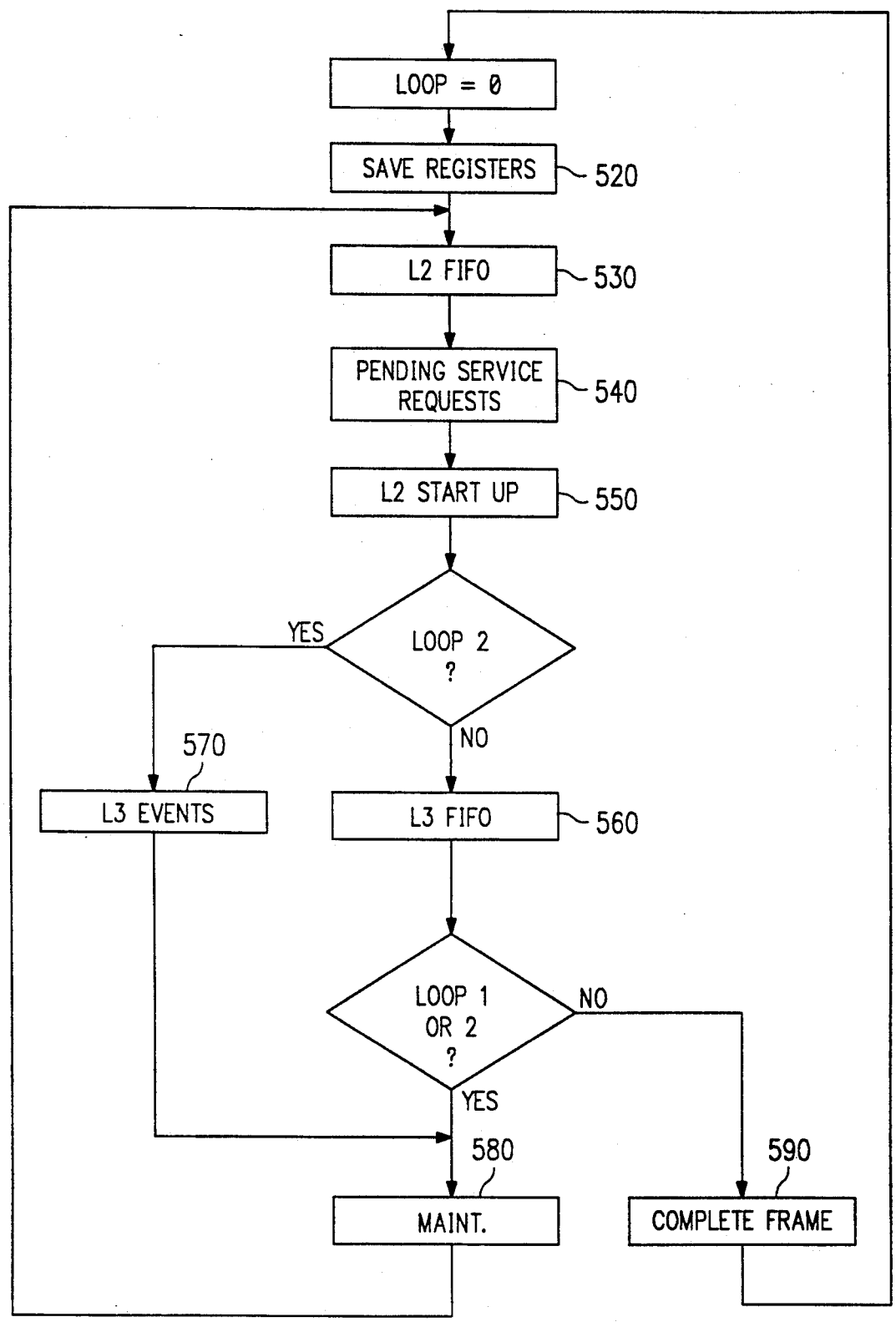
FIG. 5 illustrates the packet control processing performed by each node controller.

FIGS. 5-7 illustrate three types of synchronization related to NC operation. This synchronization is with respect to the interaction of NC's within SN 10, as well as the interaction of PCP 156, L2 controller, and L3 controller Within each NC 78. The synchronization is implemented with the two frame periods discussed above: the NC frame period and the packet frame. In the example of this description, these frame periods are 200 microseconds and 40 microseconds, respectively. Within each NC frame, three packets are transferred.

FIG. 5 illustrates a NC processing schedule that all NC's 78 perform simultaneously during a NC frame. The NC schedule illustrated in FIG. 5 is common to all NC's 78 in the sense that each step occurs at the same time. It should be understood, however, that within each step, the operation of a particular NC 78 may vary, depending on the status of the NC 78, such as whether it is a server or originator NC 78 or is neither during that frame period. Several processes occur more than once during each NC frame. In particular, the L2 FIFO, pending service request, and L2 controller startup processes each occur three times, and the L3 FIFO process occurs twice.

Node control frame synchronization is obtained by means of a Level 2 sync message sent by all NC's 78 when they detect the absence of a hold signal delivered from MC 102. Of all these messages sent, the only message actually received is the message from a reference NC 78. Upon receipt of that message, all NC's 78 resynchronize their NC frame.

To maintain sychronization, the NC frame is driven by a clock interrupt, which for purposes of example herein, is a 200 microsecond interrupt. The clock used to generate the interrupt is from MC 102 and distributes to IN 106 and GWY's 82.

FIG. 6 is a timeline that illustrates the processing within each NC 78. It lists allocations of time per processing step, and relates the interaction of the processing performed by L2 controller 176, PCP 156, and L3 controller 196. Consistent with FIG. 5, FIG. 6 shows that PCP 156 performs several processes more than once.

FIG. 7 is a timeline that illustrates processing of an ONC 78 and an SNC 78, and more particularly the processing of their L2 subsystems 40. As illustrated, a packet is transferred from an ONC 78 to a SNC 78 during one packet frame period.

Comparing FIGS. 6 and 7 with respect to L2 processing, it should be understood that FIG. 6 illustrates those steps that involve PCP interaction. The OPAK/SPAK low step occurs with a HOLD release, at which time PCP FIFO data is available and an L2 message receiver is disabled. The HOLD set step occurs together with an OPAK/SPAK message, at which time a PCP SPAK buffer is initialized, the L2 message receiver is enabled, and a PCP request buffer is initialized. The steps of FIG. 7 illustrate further detail of L2 controller operation. An SPAK extension function processes the SPAK buffer, and a service request function processes the request buffer.

Referring to FIGS. 5-7, from the point of view of operation of an ONC 78, if an OCP 72 has a flag set in its status buffer indicating that it desires to send an inbound message, L3 controller 196 detects the flag during its scanning of CP's 72. L3 controller 196 sends a signal to L3 FIFO 233 via multiplexer 230. In response to this signal, PCP 156 changes the control buffer on L3 controller 196, such that on the next pass of L3 controller 196, the packet is transferred from OCP 72 to PDM 232 via L3 transport 198. To effect the transfer, L3 controller 196 provides L3 transport 198 With an address in PDM 232 and a count of the number of bytes to be transferred. Enabling signals are sent to multiplexer 206 and to L3 controller 196 via L3 controller data bus 192 and control line 214 to set up a data transfer path. L3 transport 198 generates the control signals necessary to transfer the data to PDM 232.

After the data from OCP 72 has been stored in PDM 232 of ONC 78, PCP 156 signals L2 controller 176 to transfer the data from PDM 232 to GW interface 166. L2 controller 176 operates in a manner similar to L3 controller 196. To transfer the data from PDM 232 to GW interface 166, L2 controller 176 initiates a transfer in L2 transport 170. L2 controller sends the L2 transport 170 an address pointer and a count of bytes to be transferred, but does not execute the transfer until a packet connection through SN 10 has been provided.

When two NC's 78 are connected, SNC 78 receives server path acknowledgement (SPAK), asserts a hold signal, and enables a L2 message receiver. ONC 78 receives SPAK, asserts hold, and enables its L2 message receiver.

The PCP 156 in ONC 78 then triggers ONC 78 to execute a service request PCP function buffer that issues a service request (RFS). The PCP 156 in SNC 78 triggers SNC 78 to execute a SPAK extension PCP function buffer that sends a ready message (RDY) to ONC 78 and issues a release request (RR).

Upon receipt of RDY, ONC 78 writes RDY and a server node identifier to L2 FIFO 177 and sends a request to send (RTS) message to SNC 78. Upon receipt of RTS, SNC 78 writes RTS and a server processor identifier to L2 FIFO 177, sends a clear to send (CTS) message to ONC 78, and prepares L2 transport 170 to receive packet data.

Upon receipt of CTS, ONC 78 sends PKT, followed by the packet data.

Upon completion of packet data, SNC 78 sends packet acknowledgement (PKTA) to ONC. Upon receipt of PKTA, ONC 78 writes PKTA to its L2 FIFO 177 and sends package acknowledgement acknowledged (PKTAA) to SNC 78. Upon receipt of PKTAA, SNC 78 writes PKTAA to its L2 FIFO 177.

L2 FIFO Processing

Referring to FIG. 5, step 530 of the NC process is processing L2 FIFO 177. FIGS. 6 and 7 provide further detail of this process.

The L2 FIFO process first determines the L1 connect status. If the resident node can make requests, the process releases a hold signal. The subsequent steps of the process depend on a message from GW 82, in particular, whether the message is an originating path acknowledgement (OPAK) or a server path acknowledgement (SPAK).

Figure 8:
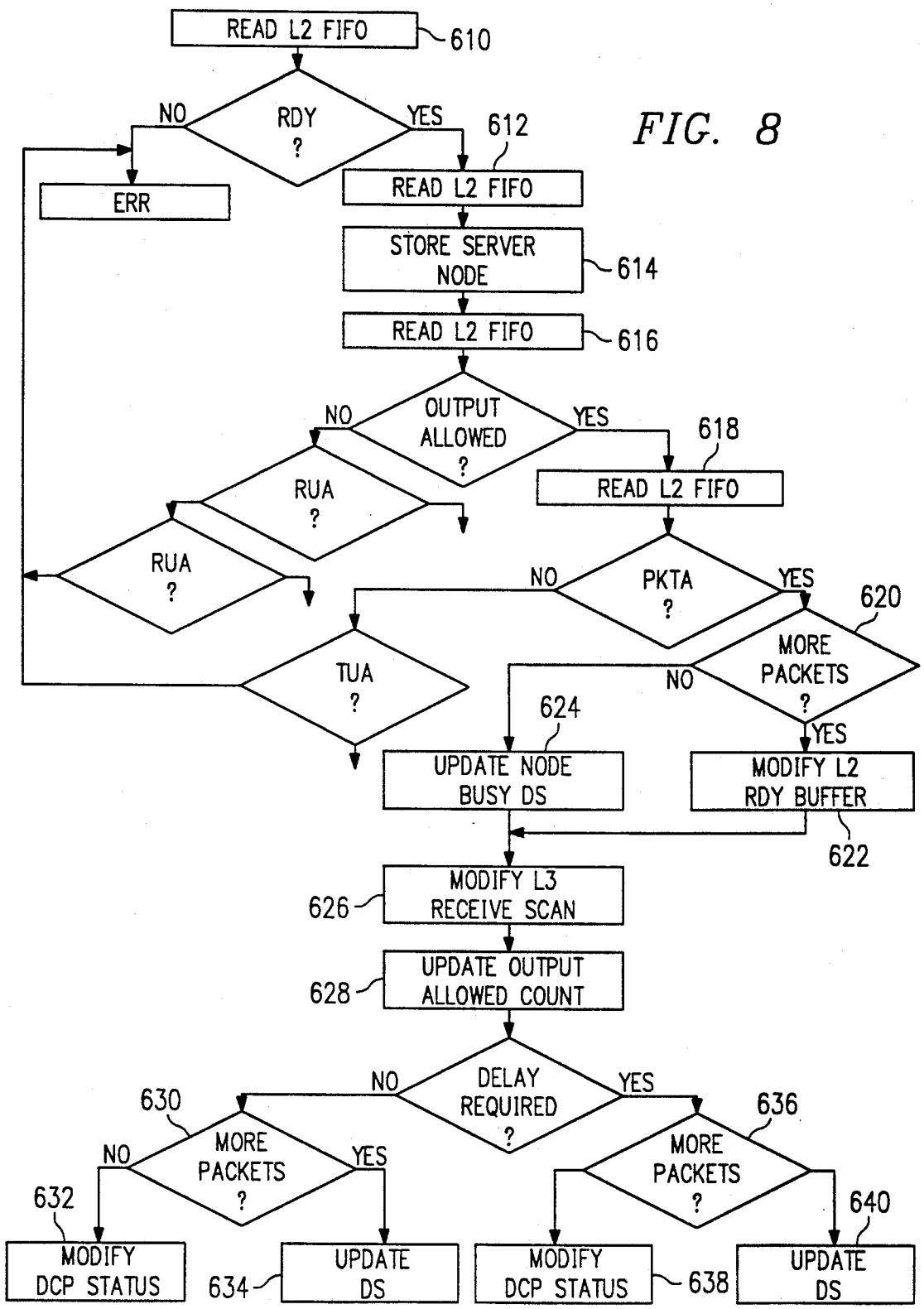
FIG. 8 illustrates the processing for an originator path acknowledgement in the L2 FIFO.

FIG. 8 illustrates the L2 FIFO process for an OPAK message, i.e., the operation of an ONC. As discussed above, this message is accompanied by PCP 156 disabling the L2 message receiver. In step 610, PCP 156 reads the L2 FIFO. If the result of the read is a ready (RDY) message from a nonresident node, step 612 reads the next data byte from L2 FIFO to identify the server node. Step 616 reads another byte in the L2 FIFO to determine the output allowed count.

If the read of step 616 represents an output allowed count, step 616 reads the next byte, which it references as the status of the packet transmission. If the transmission was successful, i.e., receipt of a PKTA message, step 620 determines whether there are further packets awaiting transmission to the server node. If so, step 622 modifies the L2 RDY buffer by identifying the DCP and setting PDM addresses to the addresses of the oldest buffer on the destination node output queue. If there are no further packets awaiting transmission, step 624 modifies a node busy data structure to indicate that the destination node has no packets pending transmission.

Step 626 is modifying the L3 receive scan to enable scan logic for the OCP. Step 626 updates the output allowed frame count for the DCP, based on the contents of the output allowed count.

If the output allowed count received in step 616 indicates that no delay is required before outputting an additional packet, step 630 determines whether there are additional packets awaiting transmission. If not, step 632 modifies the status of the DCP to indicate that output is allowed. If so, step 634 modifies the originating buffer that has been on the DCP output holding queue the longest in the output buffer data structure, and modifies the maintenance action required data structure to indicate that the output buffer data structure contains data to process.

If the output allowed count received in step 616 indicates that a delay is required, step 636 determines whether there are additional packets awaiting transmission. If not, step 636 is modifying the status of the DCP to indicate that output is disallowed. If so, step 640 is modifying originating buffer that has been on the DCP output holding queue the longest in the time data structure, and modifying the maintenance action required data structure to indicate that the time buffer data structure contains data to process.

Figure 9:
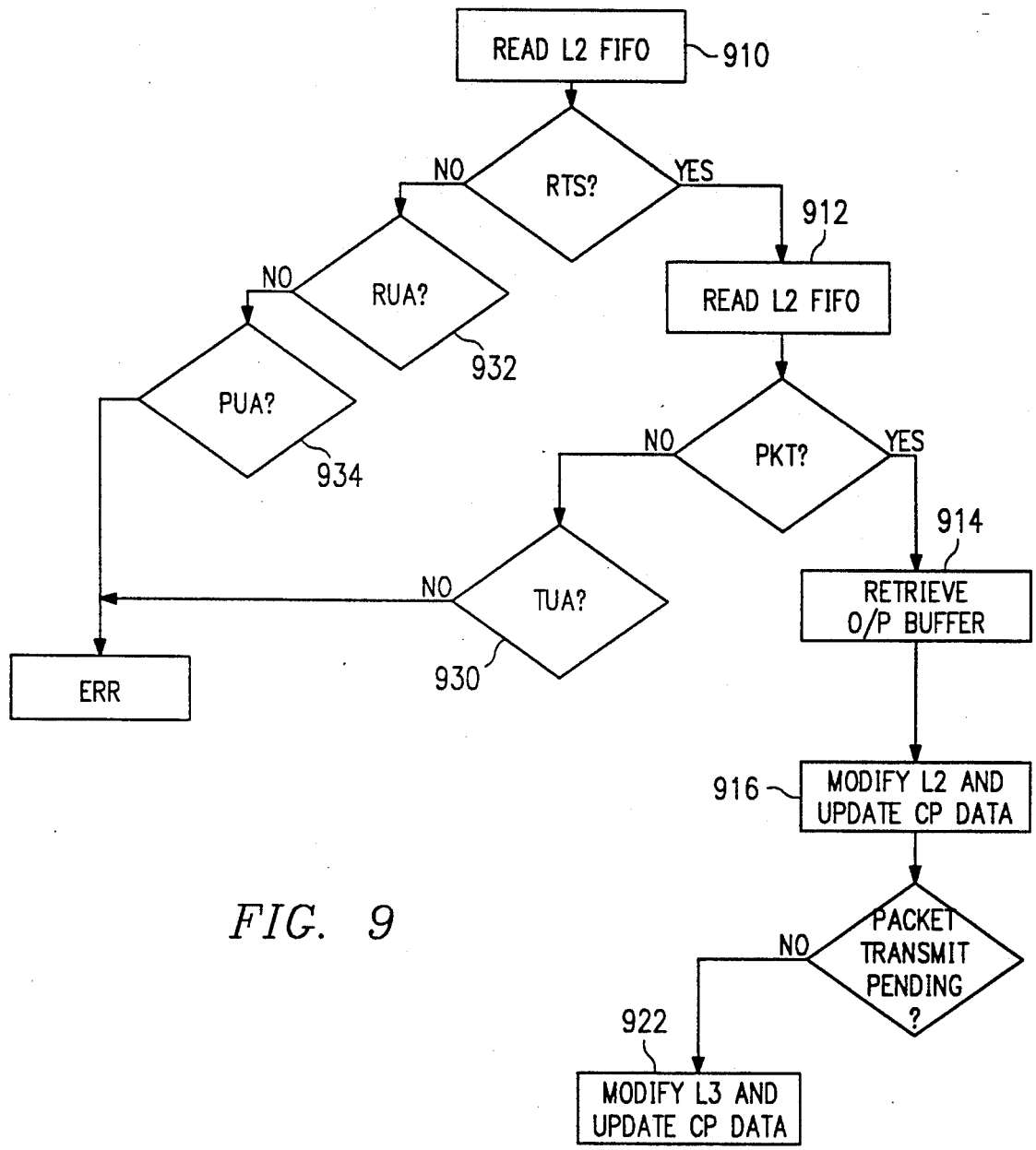
FIG. 9 illustrates the processing for a server path acknowledgement in the L2 FIFO.

FIG. 9 illustrates the L2 FIFO process for a server path acknowledgement (SPAK) message, i.e., the operation of a SNC. After disabling the L2 message receiver, in step 910, PCP 156 reads L2 FIFO 177. If the read is a RTS message, step 912 is reading the L2 FIFO for status information.

If the status read of step 912 indicates a successful packet transmission, i.e., a PKT message, step 914 retrieves the next available output buffer from the output buffer free queue. Step 916 modifies the L2 receive instructions in the RTS buffer for the DCP to match the PDM addresses of the newly acquired output buffer, updates the DCP output queue with the buffer associated with the packet that was just read, and modifies the L2 RTS buffer for DCP to transmit the new output allowed count. If the DCP does not have a packet transmit pending status, step 922 modifies the L3 transmit instructions to match the PDM addresses of the packet just read, modifies the L3 transmit scan to enable scan logic for the DCP, and modifies the CP busy data structure to indicate that the DCP has a packet pending transmission.

If the L2 FIFO read of step 912 is not a PKT message, step 930 determines whether the read is transmitter unavailable (TUA). If so, the process does nothing. Otherwise, the process assumes an error condition.

If the L2 FIFO read of step 910 is not RTS, steps 932 and 934 determine whether the read is a receiver unavailable (RUA) or packet unavailable (PUA) message. If RUA or PUA, the process does nothing. If not RUA or PUA, the process assumes an error condition.

For a NULL status, the L2 FIFO process performs differently, depending on how the programming of PCP 156 has modified its logic. One of the following subprocesses is called:
1) process L3 event queue,
2) idle NC,
3) configure GW,
4) constant monitor GW,
5) abort all but resident node,
6) release resident node, and
7) restart resident node.

Each of these subprocesses is described in the immediately following paragraphs.

(1) L3 event queue

This process is described below in connection with step 570 of FIG. 5.

(2) Idle NC

This subprocess modifies the programming of PCP 156 to invoke a Configure GW subprocess on upon an idle L2 transaction in L2 FIFO.

(3) Configure GW

If a reset data structure indicates that a GW reset is required, this subprocess enables a reset in a configure GW function buffer of PCP 156, starts the buffer, then disables the reset. The subprocess then enables a constant monitor GW function buffer in PCP 156 and starts the buffer.

The subprocess then reads and compares clock/frame select and error data from the GW FIFO maintained by PCP 156. If there are no miscompares and if a reply data structure indicates a reply is required, the subprocess modifies the buffer header message type to reply and queues on the OS/PCP queue. If there are miscompares and if the reply data structure indicates that a reply is required, the subprocess provides an error code to a configuration message, modifies the buffer header message type to reply and queues on the OS/PCP queue.

After testing for miscompares, the subprocess clears the reply data structure. Then, if an auto release data structure indicates that auto release is required, the subprocess modifies the programming of PCP 156 to invoke abort all but resident node upon an idle L2 transaction in the L2 FIFO. If no auto release is required and if hold is not set, the subprocess modifies the programming of PCP 156 to restart the resident node upon an idle L2 transaction.

(4) Constant monitor GW

This subprocess first compares gateway state register data to GW hold timer data.

If there is a miscompare and if the GW hold timer is zero, the subprocess modifies a configure GW function buffer to enable a reset, starts the configure GW function buffer, indicates that the resident node cannot make requests or process requests and that it is not in synchronization, indicates that hold is set, and sets the hold timer to a predetermined value. If there is a miscompare and the GW hold timer is not zero, the subprocess starts the configure GW function buffer, increments the hold timer, and if the hold timer exceeds a predetermined threshold, reports an error.

If there are no miscompares, and if the GW state register data indicates that hold is not set, the subprocess disables reset in the configure GW function buffer, indicates that hold is clear, modifies the L2 FIFO to invoke configure GW upon an L2 idle transaction, sets a clock interrupt vector to an error routine, sets the clock interrupt interval to a predetermined value, enables the clock interrupt, builds in a time delay, enables L2 receiver, starts a PCP function buffer to send a synch command.

The subprocess then scans L2 FIFO for the synch command, and upon receipt, disables the L2 receiver, indicates the resident node is synchronized, sets the clock interrupt to a normal routine, and sets the interrupt interval to a predetermined value.

(5) Abort all but resident node

This subprocess downloads the first step of an auto release procedure to a GW access function memory. It then starts the memory and modifies the programming of PCP 156 to invoke release resident node upon an idle L2 transaction.

(6) Release resident node

This subprocess downloads the second step of an auto release procedure to a GW access function memory. It then starts the memory and modifies a node busy data structure to indicate that the resident node has output pending.

(7) Restart resident node

This subprocess clears the auto release data structure and modifies the programming of PCP 156 to invoke the L3 event queue process upon an idle L2 transaction in the L2 FIFO.

If the resident node is synchronized, the subprocess also indicates that the resident node can make and process requests.

Pending Service Request List Processing

Referring again to FIG. 5, step 540 is processing a pending service request list. If there are any pending requests for service, and if the resident node can handle requests, the process modifies the issue service request/read hold PCP buffer to issue a request for service (RFS) for the node that has been on the queue the longest. Otherwise, the process modifies the issue service request/read hold PCP buffer to not issue a service request.

L2 Start-Up Processing

Referring again to FIG. 5, step 550 is L2 start-up processing. This first process initializes L1 connect status to idle and sets a hold signal. If the GW associated with the NC is configured, the process initiates an issue service request/read hold buffer, and reads data from a GW FIFO.

If hold is set, the L2 start-up process also modifies the L2 FIFO process of step 530 to process constant monitor hold results.

Otherwise, if the resident node can handle requests, the process reads OPAK/SPAK messages from a register of CIO 156c and saves them in a L1 connect status data structure. For SPAK, the process enables the L2 receiver by setting a bit in an L3 control register and initiates an SPAK extension buffer. For OPAK, the process enables the L2 receiver by setting a bit on the L3 control register.

L3 FIFO Processing

Referring again to FIG. 5, step 560 is processing L3 FIFO 233. This process first reads the next event from L3 FIFO 233, which will be one of the following events:

(1) no-event,
(2) CP-ready-to-receive,
(3) CP-message-available,
(4) end,
(5) scan-update,
(6) error,
(7) restart, and
(8) maintenance.

Each of these events is associated with a subprocess, as described in the immediately following paragraphs.

(1) No event

This subprocess saves an L3 dead error status in the resident PCP database, and indicates that an error report is pending for the OS/PCP queue process.

(2) CP-ready-to-receive

This subprocess disables the scan function for the CP represented in the CP-ready-to-receive data byte. It also queues an event on the L3 event queue.

(3) CP-message-available

This subprocess disables the scan function for the CP represented in the CP-message-available data byte, and queues CP-message-available data on the L3 event queue. It also reads and stores data from L3 FIFO 233, including a start sentinel, a message type, and SNC and DCP identifiers.

(4) End

This subprocess signals the completion by PCP 156 of the L3 FIFO process. The subprocess returns processing to the main logic flow of FIG. 5.

(5) Scan update

This subprocess's performance depends on the contents of the data portion of a scan update byte. The scan update data may indicate a receive scan or a transmit scan, and either type of scan may have been completed before or at a stopping point.

If a receive scan was completed before a stopping point, the subprocess reads a scan stop point from L3 FIFO 233, reloads the previous contents for the receive scan entry point for the CP represented in a previous read scan stop point, causes a jump to the scan entry point for the CP represented in a receive scan stop point, and modifies the contents for the scan entry point associated with the CP that will be represented as a new read scan stop point.

If a transmit scan was completed before a stopping point, the subprocess read a transmit scan stop point from the L3 FIFO 233, reloads the previous contents for the transmit scan entry point for the CP represented in the previous transmit scan stop point, causes a jump to the entry point for the CP represented in the transmit scan stop point, modifies the contents for the scan entry point for the CP that will be represented as previous scan stop point, and invokes read done logic for the CP represented in the transmit scan stop point.

If a receive scan was completed at a stopping point, the subprocess reloads the previous contents for the receive scan entry point for the CP represented in the previous read scan stop point, causes a jump to the scan entry point for the CP represented in the previous read scan stop point, and modifies the contents for the scan entry point for the CP that will be represented as the new read scan stop point.

If a transmit scan was completed at a stopping point, the subprocess reloads the previous contents for the transmit scan entry point for the CP represented in the previous transmit scan stop point, causes a jump to the scan entry point for the CP represented in the previous scan stop point, and modifies the contents of the scan entry point for the CP that will be represented as the new transmit scan stop point.

(6) Error

This subprocess updates the L3 event queue to identify the CP that encountered the error, and takes appropriate action depending on the type of error.

(7) Restart L3

If L3 FIFO 233 is empty, this subprocess restarts L3 controller 196.

(8) Maintenance

This subprocess may call one of three functions:

(a) write PDM
(b) reset CP
(c) purge CP LIFO

Each of these functions is described in the immediately following paragraphs.

The write PDM function modifies L3 controller 196 so that a register is initialized to a no operation (NOP) condition and updates the L3 event queue to indicate that write PDM processing is required on the output buffer identified in the write PDM state function data structure. The function also modifies the postponed maintenance action required data structure so that the PCP/OS event queue can be processed.

The reset CP function modifies the L3 controller so that a register is initialized to a NOP condition and updates the L3 event queue to indicate that reset CP processing is required for the CP identified in the data byte following the maintenance function command byte. The function also modifies the postponed maintenance action required data structure so that the PCP/OS event queue can be processed.

The purge CP FIFO function modifies the L3 controller so that a register is initialized to a NOP condition and updates the L3 event queue to indicate that purge CP LIFO processing is required for the CP identified in the data byte following the maintenance function command byte. The function also modifies the postponed maintenance action required data structure so that the PCP/OS event queue can be processed.

L3 Event Queue Processing

Step 570 of FIG. 5 is processing an entry from the L3 event queue. Queue entries contain data that indicates the type of event to be processed, the CP associated with the event, and other data pertinent to the event. The following are possible events in the L3 event queue:

1) CP-ready-to-receive,
2) CP-message-available,
3) write-PDM,
4) reset-CP,
5) purge-CP-LIFO, and
6) bus-timeout.

Subprocesses associated with each of these events are described in the following paragraphs. If the L3 event queue contains no events to process, the maintenance action required data structure is processed.

(1) CP-ready-to-receive

Figure 10:
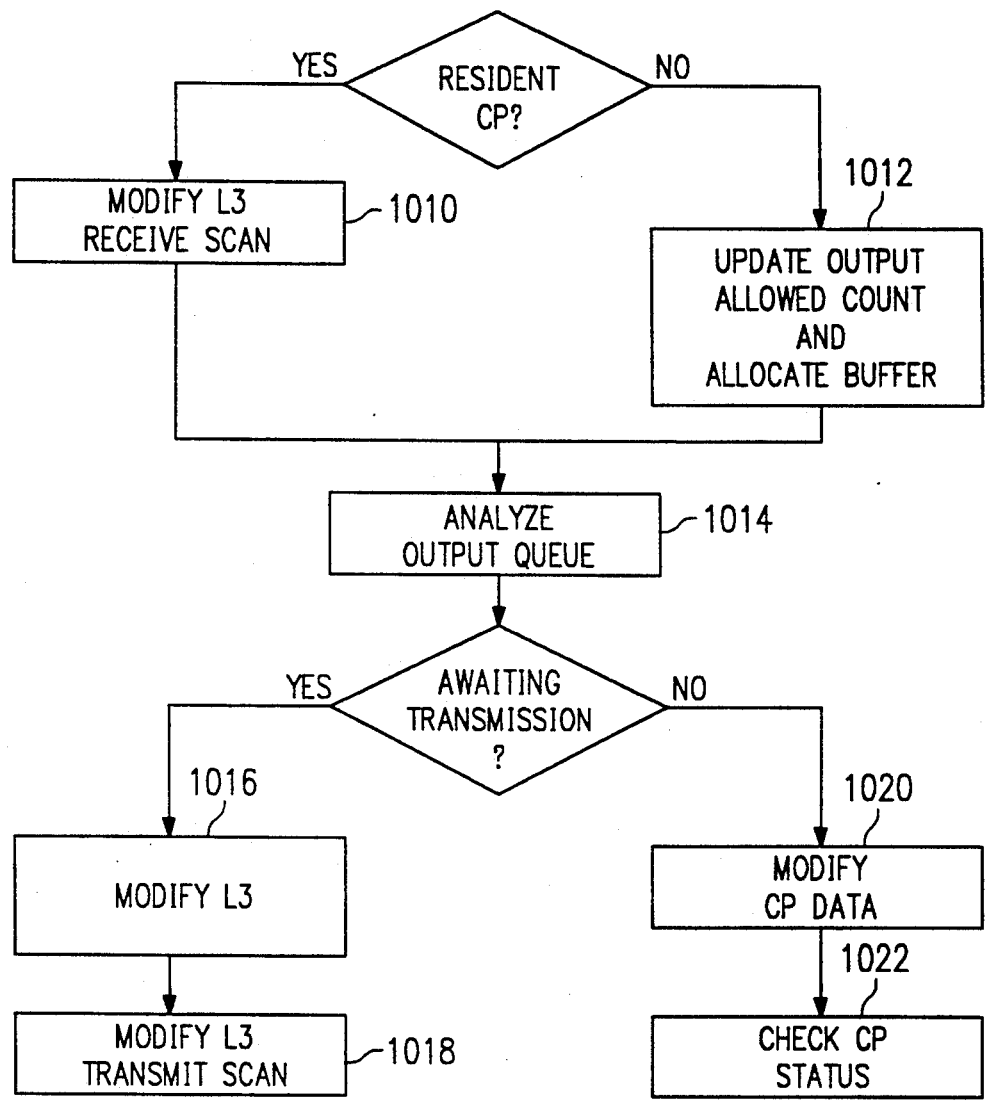
FIG. 10 illustrates the processing for a CP-ready-to-receive event in the L3 event queue.

FIG. 10 illustrates the subprocess for a CP-ready-to-receive event. This subprocess performs a first step differently according to the location of the OCP. If the OCP is resident to the NC, step 1010 modifies the L3 receive scan to enable scan logic for the OCP. If the OCP is non-resident, step 1012 updates the output allowed count for the DCP in the L2 RTS buffer associated with the DCP and allocates the transmitted buffer to the output buffer free queue.

Step 1014 is analyzing the output queue of the DCP. If output buffers are awaiting transmission, step 1016 is modifying the L3 transmit PDM instructions for the DCP to match the PDM address of the next packet to be transmitted, i.e., the packet associated with the oldest output buffer on the DCP output queue. Step 1018 modifies the L3 transmit scan to enable scan logic for the DCP. However, if no output buffers are awaiting transmission, step 1020 is modifying the CP busy data structure to indicate that the DCP has no packets awaiting transmission. Step 1022 is checking the status of the DCP and invoking logic to de-activate the DCP if the status is transmit only.

(2) CP-message-available

Figure 11:
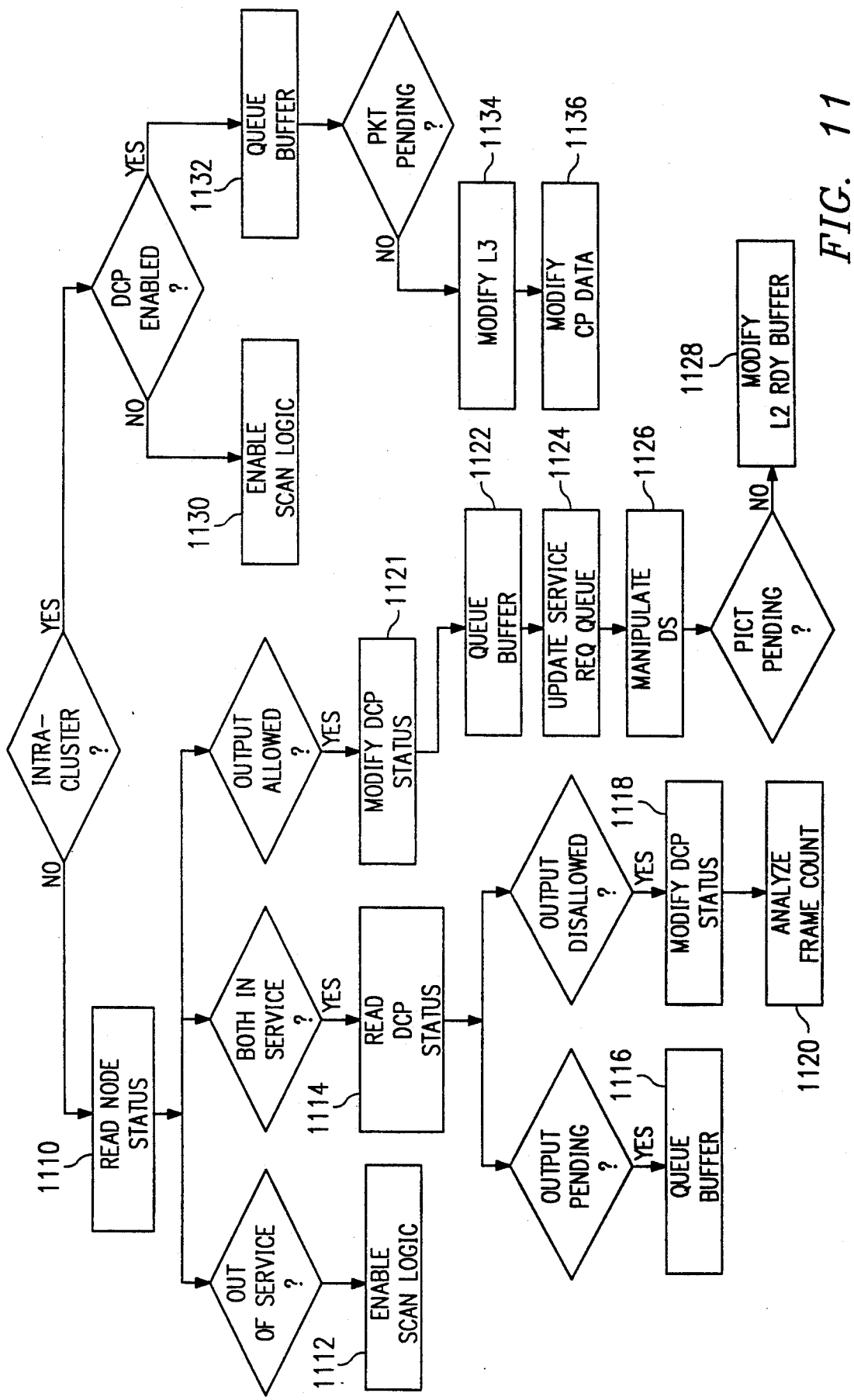
FIG. 11 illustrates the processing for a CP-message-available event in the L3 event queue.

FIG. 11 illustrates the subprocess for a CP-message-available event. This subprocess performs differently according to the contents of a start sentinel. If the sentinel is an appropriate header, the subprocess initiates packet processing. This processing is different depending on whether the packet is intra-cluster or inter-cluster, i.e., whether DCP is resident or not. Other start sentinels may be used to initiate operating system or error processes.

For inter-cluster packets, step 1110 is reading the status of the resident and destination node. If the destination node and/or the resident node status is out-of-service, step 1112 modifies the L3 receive scan to enable scan logic for the OCP. If the status of the destination node and the resident node are in-service, step 1114 reads the status of the DCP. If this status is output pending, step 1116 queues the buffer associated with the packet that was just read to the output holding queue for the DCP. If the status is output disallowed, step 1118 modifies the status of DCP to indicate that it has output pending.

Step 1120 analyzes the output allowed frame count. If the output allowed frame count is less than or equal to the current frame count or the delta of the counts is greater than or equal to the maximum frame count collision delay, the process modifies the output buffer data structure and the further maintenance action required data structure to indicate that the output buffer data structure contains data to process. Otherwise, the subprocess modifies the time buffer data structure and the maintenance action required data structure to indicate that the time buffer data structure contains data to process.

If the destination node and/or the resident node status is output allowed, step 1121 modifies the DCP status to indicate that it has output pending. Step 1122 queues the buffer associated with the packet just read to the node output queue associated with the destination node identifier. Step 1124 updates the pending service request queue with the destination node identifier, and modifies the node busy data structure to indicate that the destination node has a packet pending transmission. If the destination node has no other packets awaiting transmission, step 1128 modifies the L2 RDY buffer for the destination node by identifying the DCP that is to receive the packet that was just read and setting the PDM addresses to the PDM addresses of that packet.

For intra-cluster packets, the CP-message available subprocess first checks the status of DCP. If DCP is disabled, step 1130 modifies the L3 receive scan to enable scan logic for the OCP. Otherwise, step 1132 queues the buffer associated with the packet that was just read to the output queue of DCP. If DCP does not have a packet pending transmission, step 1134 modifies the L3 transmit PDM instructions for DCP to match the PDM addresses of the packet just read and modifies the L3 transmit scan to enable scan logic for the DCP. Step 1136 modifies the CP busy data structure to indicate that DCP has a packet pending transmission.

(3) Write-PDM

The processing for a write-PDM event first determines whether the DCP has an enabled status. If the DCP is enabled, the process queues the output buffer to the DCP output queue. Then, if DCP does not have a packet pending transmission, the process also modifies the L3 transmit PDM instructions to match the PDM addresses of the output buffer, modifies the L3 transmit scan to enable scan logic for the DCP, and modifies the CP busy data structure to indicate that DCP has a packet pending transmission. If the DCP is not enabled, the process updates the output buffer free queue with the output buffer.

(4) Reset-CP

The processing for a reset-CP event determines whether the CP is active. If so, the process deactivates it.

(5) Purge-CP-LIFO

The processing for a purge-CP-LIFO event enables receive scan function on program area assigned to CP, and indicates that CP status is active.

(6) Bus-timeout

The processing for a bus-timeout event, if the CP status is active, de-activates the CP, saves the bus timeout error status in a CP database, and indicates that an error report is pending for the process OS/PCP queue function.

Maintenance Functions

Step 580 of the NC process of FIG. 5 is executing one of the following maintenance functions, based on the contents of a constant monitor function array:

1) CP busy timing,
2) node busy timing,
3) output buffer timing, or
4) miscellaneous counting.

These functions are explained in further detail in the next four paragraphs.

(1) CP Busy Timing

The CP busy timing function performs a number of substeps. A first step captures a CP data structure into a current captured processor data structure. A second step increments the current captured CP data structure address. A third step processes a current saved CP data structure by AND'ing the current saved CP data structure with the CP data structure. If the resulting structure is not zero, the function saves the results in a CP busy timeout data structure, and modifies a further maintenance action required flag to indicate that the CP busy timeout data structure has data to process. A fourth step increments the current saved CP data structure address.

(2) Node Busy Timing

The node busy timing function has four steps. It captures a node data structure into a current captured node data structure. It also increments a current captured node data structure address. It processes the current saved node data structure by AND'ing the current saved node data structure with the node data structure. If the resulting structure is not zero, the function saves the results in a node busy timeout data structure, and modifies a further maintenance action required flag to indicate that the node busy timeout data structure has data to process. Finally, it increments the current saved node data structure address.

(3) Output Buffer Timing

The output buffer timing function advances a current entry pointer into a buffer timer data structure. If the contents of the current entry is not zero, the function also combines the contents of the current entry with an output buffer data structure. If the result is not zero, it modifies a maintenance required data structure to indicate that the output buffer data structure has data to process.

(4) Miscellaneous Counting

The miscellaneous counting function performs several steps if L2 controller 176 is active. These include first incrementing a self test frame count. If the self test frame count exceeds a threshold, the function does the following: clears the self test frame count, selects a next clock test value to test, modifies the GW constant monitor PCP function buffer to use the selected clock test value, modifies an expected clock test result, clears the self test frame count, places a resident node identifier on a pending service request list, sets self test in progress, and exits. Otherwise, the function increments a node locked timer. If the node locked timer exceeds a threshold, the function copies a node locked data structure to a re-issue service requests data structure, clears the node locked data structure, modifies the PCP logic to invoke a command to process re-issue service requests instead of a pending service request list, clears the node locked timer, and exits.

Regardless of whether L2 controller 176 is active, the miscellaneous counting function increments a deactivate node interval. If the deactivate node interval value exceeds a threshold, the function clears the deactivate node interval, and advances a current entry pointer into a deactivate node timer data structure. If the contents of the current entry is not zero, the function combines the contents of the current entry with the pending deactivate node data structure, and modifies the further maintenance required data structure to indicate that nodes are pending deactivation.

Complete Frame

Step 580 of the NC process of FIG. 5 is the complete frame process. This process combines the contents of the postponed maintenance action required data structure with the maintenance action required data structure. It then executes a subprocess on the basis of a priority scheme as follows, where the subprocesses are listed in order of high priority to low:

(1) process output buffer data structure,
(2) process PCP/OS event queue,
(3) process pending de-activate node data structure,
(4) process node busy timeout data structure,
(5) process CP busy timeout data structure,
(6) read PDM, and
(7) write PDM.

Each of these subprocesses is further described in the following paragraphs. As explained below, the complete frame process may include OS processing. After performing one of these subprocesses, the complete frame process restores registers, and returns from the interrupt.

(1) Process output buffer data structure

The output buffer data structure subprocess deselects the first buffer indicated in the output buffer data structure. If the resulting output buffer data structure is zero, the process modifies the maintenance action required data structure to indicate that the output buffer data structure has no data to process. Otherwise, the process modifies the status of the DCP to indicate that the DCP has output pending. The process then invokes an intercluster packet process.

(2) Process PCP/OS event queue

The process PCP/OS event queue process processes an event from a PCP/OS event queue, which represents both packet control and operating system events. These events include the following:

a) activate CP, b) de-activate CP,
c) activate node,
d) de-activate node,
e) configure GW,
f) transmit L4 message,
g) re-initialize,
h) free operating system buffer
i) reset CP, and
k) initialize node.

These events are each associated with a subfunction, as described in the following paragraphs.

The activate CP subprocess obtains the next available L3 program area from the L3 queue. When this program area is available, the subprocess modifies the buffer header message type to reply and event queue, modifies the select CP instructions in the L3 receive scan, L3 transmit scan, receive header logic, receive packet logic, and transmit packet logic for the given L3 program area to contain the proper address bits of CP. It also indicates in the postponed maintenance action required structure that the event queue is not to be processed. It modifies select CP instructions in the purge CP LIFO area to contain the proper address bits. It modifies a register to contain the appropriate value to invoke the purge CP LIFO, and modifies L3 controller 196 to indicate in L3 FIFO 233 that the register has been modified and the identity of the CP whose LIFO is to be purged.

The deactivate CP subprocess modifies the buffer header message type to reply and queue on the PCP/OS event queue. It frees the L3 program area reserved for the CP. If the CP is busy, the subprocess queues CP ready to receive for disabled CP data on the L3 event queue. The subprocess also disables the receive scan function and transmit scan function program areas associated with the CP in L3 controller 196. It also indicates that the CP is deactivated.

The activate node subprocess first determines whether the node to be activated is the resident node. If so, the subprocess modifies a PKTA RAM to send a PKTAA message, modifies an SPAK extension PCP buffer to contain the in-service node SPAK extension PCP buffer logic, and indicates that the resident node status is active. If the node to be activated is not the resident node, the subprocess modifies the CP number in a RDY RAM assigned to the activated node to signify packet unavailable, indicates the node is active, saves node identity as re-directed node for node being activated, and modifies the node status change message type to release and queue message on OS/PCP queue.

The deactivate node subprocess manipulates an element associated with the node to be deactivated in the entry of the node deactivation timer array, and modifies the node status change message type to release and queue message on OS/PCP queue.

The configure GW subprocess initializes a reset required data structure to indicate that no reset is required. The subprocess then advances to the next command in the configuration message until the end of list is encountered. For an initialize reset command, the subprocess indicates reset is required and that GW action is required. For a link update command, the subprocess updates GC status based on contents of a bitmap in the configuration message, modifies a GW constant monitor PCP function to select another enabled clock if the clock currently selected indicates a disabled status, modifies an expected clock test result, creates an error register mask based on the contents of the link update bit maps, updates the active GC select data structure based on the contents of the bitmap in the configuration message, and if the active GC select data is different than previous, modifies the GW configuration PCP function buffer to reflect new GC select data and indicates that GW action is required.

Upon the end of the command list and if no GW action is required, the subprocess modifies the configuration buffer header message type to reply and queue on the OS/PCP queue. Upon the end of the command list and if GW action is required, the subprocess sets the resident node as not being allowed to make requests, saves the address of the configuration message, indicates in the postponed maintenance action required data structure that the PCP/OS event queue is not to be processed, and modifies the reply data structure to indicate that reply is required. If hold is not set, the subprocess modifies PCP instructions to invoke idle NC upon idle L2 transaction in L2 FIFO 177.

The transmit L4 message subprocess performs differently depending on a state number. For state 1, the subprocess gets an output buffer, saves the identity of the output buffer in a write PDM state function data structure, saves a DCP in the output buffer data structure, saves an OS buffer address in the output buffer data structure, loads a number of bytes of packet data into L3 FIFO 233, saves the address of where the next byte should be transferred from L4 message into L3 FIFO 233 in a write memory state function data structure, sets state number to 2 in the write memory state function data structure, modifies the maintenance action required data structure to indicate that further processing is required to complete the write memory function, and indicates in the postponed maintenance action required data structure that the PCP/OS event queue is not to be processed. For state 2, the transmit level 4 message subprocess loads a number of bytes of packet data into L3 FIFO 233 from where the last state ended, saves the address of where the next byte should be transferred from level 4 message into L3 FIFO 233 in the write memory state function data structure, and sets the state number to 3 in the write memory state function data structure.

For state 3, the transmit level 4 message subprocess loads a number of bytes of packet data into L3 FIFO 233 from where the last state ended, modifies the buffer header message type to release and queue on the PCP/OS queue, modifies the write memory instructions in the write memory program area of L3 controller 196 to match the PDM addresses of the write memory buffer, modifies register 3 to contain the appropriate value to invoke write memory logic and modifies L3 controller 196 to indicate that register 3 has been modified, and modifies the further maintenance action required data structure to indicate that no further processing is required of the write memory subprocess.

The re-initialize subprocess re-initializes L3 controller 196 with no CP's active, re-initializes the L3 program area queue with enough entries to match the number of CP's subordinate to the resident NC 78, and re-initializes the L3 logic associated with the last CP in the receive and transmit scan list.

The free operating system buffer subprocess examines the CP's pending an OS buffer data structure. If no CP's are pending, the subprocess updates the KXPCP free buffer queue with a newly available buffer, where KXPCP refers to a set of buffers used by the OS when tandoming L4 messages. However, if CP's are pending, the subprocess modifies the L3 receive memory instructions for the OCP to match the PDM address of the PDM buffer assigned to the OS buffer pulled from the KXPCP free buffer queue. After handling the CP's pending, the subprocess modifies the PDM buffer assignment to the input buffer associated with the OCP, modifies the L3 receive scan to enable scan logic for the OCP, indicates in the OS messages pending memory transfer that the OS buffer pulled from the KXPCP free buffer queue is awaiting memory transfer. If no other buffers are pending memory transfers, the subprocess further modifies read memory instructions in a program area to match PDM addresses of the buffer previously associated with the OCP, sets the OS buffer address to the address of the buffer obtained from the KXPCP free buffer queue, causes a jump to a read PDM event, manipulates the further maintenance required data structure to indicate that further processing is required for the read PDM subprocess, and sets the state number to 1 in the read PDM state function data structure.

The reset CP subprocess modifies the buffer header message type to reply and queues on PCP/OS queue. It modifies select CP instructions in a reset program area to contain the appropriate CP address. It modifies initialization of a register to contain the appropriate value to invoke reset logic and modifies L3 controller 196 to indicate in the L3 FIFO that the initialization of the register has been modified and the identity of the CP to be reset. The subprocess then indicates in the postponed maintenance action required data structure that the PCP/OS event queue is not to be processed.

The initialize node subprocess check the OS status of the node. If the node is active, the subprocess, invokes activate node logic. If the node is not active, the subprocess invokes deactivate node logic. The subprocess then modifies a node status change message type to release and queues the message of the PCP/OS queue.

(3) Process pending deactivate node data structure

The pending deactivate node data structure process first deselects the first node indicated in the pending deactivate node data structure as the node to be deactivated. If the resulting pending deactivate node data structure is zero, the process modifies the maintenance action required data structure to indicate that the pending deactivate node data structure requires no further processing.

If the node to be deactivated is the resident node, the process modifies an SPAK extension buffer to send RUA. The process also re-enables the L3 receive scan for all OCP's that have their input buffer awaiting a L2 transaction, disarms all node busy timers, empties the service request pending list, and indicates that the resident node is deactive.

If the node to be deactivated is not the resident node, the process modifies the CP number in a RDY RAM assigned to the de-activated node to signify RUA, re-enables the L3 receive scan for all OCP's that have their input buffer awaiting a L2 transaction involving the node to be de-activated, disarms the node busy timer, and indicates the node is not active.

(4) Process node busy timeout data structure

The node busy timeout data structure process first copies a node busy timeout data structure to a node locked data structure. It creates a new node busy data structure by XOR'ing the node busy data timeout data structure with the node busy data structure.

If the resident node is indicated in the node busy timeout data structure, and if an auto release data structure indicates that an auto release has been attempted, the subprocess frees all L2 buffers, sends a L2 inhibit, and sends an error report. Otherwise, the subprocess modifies the auto release data structure to indicate that an auto release is to be attempted, modifies a reset data structure to indicate that a reset is required, indicates that the resident node cannot make or process requests, and modifies the programming of PCP 156 to invoke an idle NC upon an idle L2 transaction in the L2 FIFO.

If the resident node is not indicated, the process sets a self test, places the resident node identity on a pending service request list, and clears the auto release data structure.

(5) Process CP busy timeout data structure

The CP busy timeout data structure process first deselects the first CP indicated in the CP busy timeout data structure. If the resulting CP busy timeout data structure is zero, the subprocess manipulates the further maintenance action required data structure to indicate that the CP busy timeout data structure requires no further processing.

For the CP deselected, if the CP status is active, the process invokes logic to deactivate CP, saves the output timeout error status, and indicates that an error report is pending for the OS/PCP queue.

(6) Read-PDM

The read-PDM process performs according to the contents of a read PDM state number. For state 1, the subprocess transfers a certain number of bytes of packet data from L3 FIFO 233 into an OS buffer, saves the address of where the next byte should be transferred in a read PDM state function data structure, sets the state number to 2 in the read PDM state function data structure, and modifies the read PDM instructions of L3 controller 196 to match PDM addresses of the second half of PDM buffer associated with the OS buffer.

For state 2, the read PDM process transfers a certain number of bytes of packet data from L3 FIFO 233 to OS buffer starting where the last state was completed, modifies the OS buffer header message type to send and queue on OS/PCP queue, indicates in OS messages pending PDM transfer that the buffer has been transferred from PDM 232.

If the OS messages pending PDM transfer data structure indicates that no further OS messages are pending PDM transfer, the next step is to modify a re-initialize code. Otherwise, the next steps are modifying the read PDM instructions in L3 controller 196 to match PDM addresses of PDM buffer associated with OS first buffer indicated in OS messages pending PDM transfer data structure, and setting the state number to 1 in the read PDM state function data structure.

(7) Write-PDM

The write-PDM process performs differently according to the contents of the write PDM status function state structure. It executes an appropriate write PDM state function.

Operating System Characteristics

Although the details of the OS for SN 10 is not described herein, several OS characteristics are used to implement the invention. First, the OS manages a PCP LIFO, which contains one packet per LIFO transfer in either direction. Second, inter-node headers contain a start sentinel, a message type, a destination node address, and a destination processor address. Third, an OS task processes certain OS functions triggered by PCP 156. These functions include processing the OS/PCP queue, an OS/PCP CP error reporting data structure, and an OS/PCP node error reporting data structure. The OS/PCP queue contains events such as release and reply on selected buffers.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A synchronized node controller system, which provides an interface between user processors of processor-based communications equipment and a packet switching network, which handles control messages and packet data in accordance with a multi-level communications protocol, comprising:
   a number of gateway interfaces for sending and receiving second level protocol messages to and from a gateway of the packet switching network;
   a number of cluster processor interfaces for sending and receiving third level protocol messages to and from a cluster of user processors;
   a number of node controllers, each in data communication with a cluster processor interface and a gateway interface, wherein each node controller has:
   a packet data memory for storing packet data during switching by said packet switching network;
   a second level controller for handling the transfer of packet data between said packet data memory and said gateway interface;
   a third level controller for handling the transfer of packet data between said packet data memory and said cluster processor interface;
   a second level first-in first-out (FIFO) memory for storing messages from said gateway interface;
   a third level first-in first-out (FIFO) memory for storing messages from said cluster processor interface;
   a timing unit for receiving a node control synchronization signal, and for using this signal to generate a node control timing signal having a node control frame period that is synchronized to the node control timing signal of other node controllers; and
   a packet control processor for receiving said timing signal, and programmed for accessing messages stored in said second level FIFO memory during a first interval of said node control frame period and programmed for accessing messages stored in said third level FIFO memory during a second interval of said node control frame period, and programmed for initiating the operations of said second level controller and said third level controller in accordance with said messages.

2. The node controller system of claim 1, wherein said packet controller, said second level controller circuitry, and said third level controller of each node controller are programmed to operate in synchronization with each other, during said node control frame period.

3. The node controller system of claim 1, wherein an originating packet control processor of said node controllers and a destination packet control processor of said node controllers are programmed such that the originating node controller sends packet data during the same node control frame period as the destination node controller receives said packet data.

4. The node controller system of claim 3, wherein said originating node controller and said destination node controller are further programmed such that the packet transfer from said originating node controller to said destination node controller occurs within a packet frame period.

5. The node controller system of claim 4, wherein said timing unit generates a timing signal for defining said packet frame period.

6. The node controller system of claim 1, wherein each of said node controllers further has an event queue memory accessible by said cluster processor interface and by said packet control processor for storing messages in accordance with said third level protocol, and wherein said packet control processor of each said node controller is programmed to access its event queue in synchronization with other packet control processors.

7. The node controller system of claim 1, wherein each of said node controllers further has a service request memory accessible by said gateway interface and by said packet control processor for storing messages in accordance with said third level protocol, and wherein said packet control processor of each said node controller is programmed to access said service request memory in synchronization with other packet control processors.

8. A synchronized node controller system, which provides an interface between user processors of processor-based communications equipment, and a packet switching network, that uses a first level protocol, comprising:
   a number of gateway interfaces for sending and receiving second level protocol messages to and from a gateway of a switching network;
   a number of cluster processor interfaces for sending and receiving third level protocol messages to and from a cluster of user processors;
   a number of node controllers, each in data communication with a cluster processor interface and a gateway interface, wherein each node controller has:
   a packet data memory for storing packet data during switching by said packet switching network;
   a second level controller for handling the transfer of packet data between said packet data memory and said gateway interface;
   a third level controller for handling the transfer of packet data between said packet data memory and said cluster processor interface;
   a second level first-in first-out (FIFO) memory for storing messages from said gateway interface;
   a third level first-in first-out (FIFO) memory for storing messages from said cluster processor interface;
   a timing unit for receiving a node control synchronization signal, and for using this signal to generate a node control timing signal having a node control frame period that is synchronized to the node control timing signal of other node controllers;
   a packet control processor for receiving said timing signal, and programmed for accessing messages stored in said second level FIFO memory during a first interval of said node control frame period and programmed for accessing messages stored in said third level FIFO memory during a second interval of said node control frame period, and programmed for initiating the operations of said second level controller and said third level controller in accordance with said messages; and a service request memory for storing packet transfer service requests, and which is accessed by said processor at regular intervals during said node control frame period such that all node controllers process packet transfers synchronously.

9. The node controller system of claim 8, wherein said node control synchronization signal is generated externally to said node controllers and is delivered to each of said node controllers simultaneously.

10. The node controller system of claim 8, wherein each said timing unit defines a packet frame period that is a subset of said node control frame period.

11. The node controller system of claim 8, wherein each of said node controllers further has an event queue memory accessible by said cluster processor interface and by said packet control processor for storing messages in accordance with said third level protocol, and wherein said packet control processors are programmed such that they access said event queues in synchronization with each other.

12. The node controller system of claim 8, wherein each of said node controllers further has a service request memory accessible by said gateway interface and by said packet control processor for storing messages in accordance with said third level protocol, and wherein the packet control processors are programmed such that they access said service request memory in synchronization with each other.

13. A synchronized packet switching network in which messages are communicated in accordance with a first protocol, comprising;

a number of node controllers, each associated with a cluster processor interface and a gateway interface, wherein each node controller has a packet data memory for storing packet data during switching by said packet switching network; a second level controller for handling the transfer of packet data between said packet data memory and said gateway interface; a third level controller for handling the transfer of packet data between said packet data memory and said cluster processor interface; a second level first-in first-out (FIFO) memory for storing messages from said gateway interface; a third level first-in first-out (FIFO) memory for storing messages from said cluster processor interface; a timing unit for receiving a node control synchronization signal, and for using this signal to generate a node control timing signal having a node control frame period that is synchronized to the node control timing signal of other node controllers; and a packet control processor for receiving said timing signal, and programmed for accessing messages stored in said second level FIFO memory during a first interval of said node control frame period and for accessing messages stored in said third level FIFO memory during a second interval of said node control frame period, and programmed for initiating the operations of second level controller and said third level controller in accordance with said messages;

a number of gateways, each in communication with a node controller, for receiving requests for service from said node controllers;

an interchange control system for receiving requests for service from said gateways and for establishing connections in a switching matrix in response to said requests for service;

an interchange for implementing said switching matrix such that an originating node controller can be connected to a destination node controller;

node links for connecting said node controllers to said gateways;

request and response links for connecting said gateways to said interchange control system; and packet transport links for connecting said gateways to said interchange.

14. The switching network of claim 13, wherein each of said node controllers further has means for receiving said node control synchronization signal via said interchange.

15. The switching network of claim 13, wherein each of said node controllers further has an event queue memory accessible by said cluster processor interface and by said packet control processor for storing messages in accordance with said third level protocol, and wherein the packet control processors are programmed such that they access said event queues in synchronization with each other.

16. The switching network of claim 13, wherein further has a service request memory accessible by said gateway interface and by said packet control processor for storing messages in accordance with said third level protocol, and wherein the packet control processors are programmed such that they access said service request memory in synchronization with each other.

17. The switching network of claim 13, wherein said interchange has means for communicating a synchronization signal to all of said node controllers.

18. The switching network of claim 13, wherein said timing unit defines a packet frame timing signal for defining a packet frame within said node control frame period.

19. A method of interfacing a packet switching network to a number of user processors that handle communications of data at an origin and a destination and that are organized into groups, each group associated with a node controller, said switching network using a first level protocol for establishing and releasing connections, comprising the steps of:

using a second level protocol to handle messages between said node controllers;

using a third level protocol to handle communications between said user processors;

storing messages associated with said second level protocol in a second level memory of each of said node controllers;

storing messages associated with said third level protocol in a third level memory of each of said node controllers;

processing said second level memory;

processing said third level memory;

wherein each of said processing steps are performed in synchronization by all of said node controllers during a node control frame.

20. The method of claim 19, and further comprising the steps of storing pending service requests in a memory accessible by each of said nodes controllers during said node control frame.

21. The method of claim 19, and further comprising the step of processing an event queue associated with said third level protocol during said node control frame, synchronously with respect to all of said node controllers.

22. The method of claim 19, and further comprising the step of processing a queue containing operating system events during said node control frame, synchronously with respect to all of said node controllers.

23. The method of claim 19, and further comprising the step of processing timing monitor functions during said node control frame, synchronously with respect to all of said node controllers.

24. The method of claim 19, and further comprising the step of processing a complete-frame process that includes reading from and writing to packet data memories accessible by each of said node controllers during said node control frame, synchronously with respect to all of said node controllers.

25. The method of claim 19, wherein said steps of processing said second level memory and said third level memories occur more than once during each node control frame.

26. The method of claim 19, and further comprising the step of defining a packet frame within said node control frame, during which packet transfers occur.

27. The method of claim 26, wherein processing performed by node controllers associated with said second level protocol are processed within said packet frame.

28. The method of claim 26, wherein a number of packet frames occur within each node control frame.

29. A method of synchronizing the operation of a switching network that handles communications for processor-based user equipment and that uses a first level protocol to handle communications related to a switching matrix, comprising the steps of:

using node controllers, each associated with a cluster of user processors, to handle a second level protocol for messages between said node controllers and to handle a third level protocol for messages between user processors;

receiving a node controller synchronization signal at each of said node controllers;

defining a node control frame period with said node control synchronization signal;

performing processes associated with said second level protocol and said third level protocol during said node control frame, such that each node controller performs the same schedule of processes during said node control frame period;

defining a packet frame within said node control frame; and performing packet transfers within said packet frame.

30. The method of claim 29, wherein a number of packet frames occur during said node control frame.

31. The method of claim 29, wherein said processes include processing a second level memory of each of said node controllers and processing a third level memory of each of said node controllers, and processing pending service requests.

32. The method of claim 31, wherein said processes further include processing a third level event queue.

33. The method of claim 29, wherein said node control synchronization signal is generated externally to said node controllers, and is transmitted to said node controllers via a matrix of said switching network.

* * * * *